United States Patent [19]
Wagoner

[11] Patent Number: 5,825,639
[45] Date of Patent: Oct. 20, 1998

[54] DC BUS CAPACITOR ARRANGEMENT

[75] Inventor: Robert G. Wagoner, Waukesha, Wis.

[73] Assignee: MagneTek, Inc., Nashville, Tenn.

[21] Appl. No.: 951,549

[22] Filed: Oct. 16, 1997

[51] Int. Cl.$^6$ ....................................................... H02M 1/12
[52] U.S. Cl. .................. 363/39; 363/45; 363/50
[58] Field of Search .................. 363/35, 39, 40, 363/45, 46, 50, 51, 55; 333/167, 172, 174, 181

[56] References Cited

U.S. PATENT DOCUMENTS

| | | | |
|---|---|---|---|
| 4,331,994 | 5/1982 | Wirth | 361/56 |
| 4,398,157 | 8/1983 | Dieterich | 333/14 |
| 4,941,077 | 7/1990 | Fabianowski et al. | 363/49 |
| 5,038,244 | 8/1991 | Tuusa | 361/56 |
| 5,465,202 | 11/1995 | Ibori et al. | 363/37 |
| 5,561,596 | 10/1996 | Hemena et al. | 363/50 |
| 5,566,060 | 10/1996 | Shimer et al. | 363/65 |
| 5,668,708 | 9/1997 | Scapellati | 363/46 |

*Primary Examiner*—Peter S. Wong
*Assistant Examiner*—Y. J. Han
*Attorney, Agent, or Firm*—Waddey & Patterson; Mark J. Patterson

[57] ABSTRACT

A capacitor arrangement across a direct current bus provides a high ripple current capability and high capacitance at a low cost. The circuit is used in electronic power conversion devices such as electric motor drives and inverters. A combination of film capacitors and electrolytic capacitors are used in the circuit and are placed across the dc bus. The film capacitors carry substantially all of the ripple current, while the electrolytic capacitors provide the majority of the capacitance. A resistor and a diode are used to isolate the electrolytic capacitors from the ripple current. This results in a low cost compact bus capacitor configuration.

4 Claims, 7 Drawing Sheets

DC BUS CAPACITOR ARRANGEMENT

BACKGROUND OF THE INVENTION

This invention is related to capacitors used in electronic power conversion devices such as electric motor drives. More specifically, it relates to a capacitor arrangement across a direct current bus that provides a high ripple current capability and high capacitance at a low cost.

Electronic power conversion devices and electric motor drives create a direct current voltage that is applied to a direct current or dc bus. This voltage is then chopped by an inverter to produce output pulses usually from 2 to 20 thousand pulses per second. The width of these pulses is varied to change the motor speed. Electrolytic capacitors are usually placed across the dc bus to create a low impedance source. They can be a single capacitor or can be several capacitors. These capacitors have a large capacitance and are sized based upon their ripple current capability and life requirements. Uninteruptable power supply systems and inverters also use capacitors to filter the ripple current on the DC bus and to store energy.

In prior art bus capacitor circuits, the current flowing into the circuit (Iin) is equal to the current flowing out of the circuit (Iout) plus the current flowing through the capacitors (Ic). Iin and Iout have a DC component which is equal, because the capacitor cannot conduct a DC current. (This simplification neglects leakage current, which is negligible because it is so small compared to the current to the load). Iin and Iout both have an AC component, these sum to give the total ripple current flowing through the capacitor. The currents add because they usually are at different frequencies.

FIG. 1 shows four different configurations of prior art dc bus capacitors. A DC source with a ripple current is applied between terminals 15 and 16. The filtered voltage is applied to the load at terminals 17 and 18. A single capacitor 10 could be used or two capacitors 11 in parallel. Also, two capacitors 12 in series could be placed between the positive and negative bus. Another option that has been utilized is to use four capacitors 13. Two of the capacitors 13 are connected in series and then another pair are placed in parallel with the first pair. Any number of capacitors could be combined in these ways.

An application will be considered in the following examples for comparison. This application has ripple current coming from the input source only, and a resistive load which draws DC current only for simplicity. When the resistive load is switched on and off, the load current changes from full current to no current. When this occurs, the inductance in the source has stored energy which must be absorbed by the DC bus capacitors. This will cause the voltage to increase. For this example, the current is 230 amps rms of AC ripple current at 12Khz, and the peak input current to the filter is 800 amps maximum. The typical DC bus voltage is 750 volts, and it can be assumed there is a 200 volt margin above this for a maximum of 950 volts. The inductance on the filter input is 150 microhenries. The peak stored energy in the inductor is:

Energy=½$LI^2$=½[150 microhenries][800 amps]$^2$ =48 Joules.

The required minimum capacitance to absorb this energy and keep the maximum voltage change less than 200 volts is:

½$CV^2$ =½[C][950 volts]$^2$ =48 joules

Solving for the minimum required capacitance:

$C$=2400 microfarads

This capacitor must be capable of handling 230 amps of AC ripple current. Using only electrolytic capacitors as an example, it is helpful to calculate the number of capacitors needed and cost for this application. The limiting factor for electrolytic capacitors is their ripple current capability. Using 10,000 microfarad, 40 amp max ripple current, 450 volt (525 volt maximum) electrolytic capacitors, the following results are obtained. To get the needed voltage rating, use two capacitors in series for 900 volts. For the ripple current rating, six pairs are needed for 240 amps of ripple current capability. Total capacitance is 30,000 microfarads, which is greater than required. This gives a total of 12 electrolytic capacitors. These capacitors cost approximately $70.00 each, so the total cost is $840.

Next, using only film capacitors as an example, it is useful to calculate the number of capacitors needed and cost for this application. The limiting factor for film capacitors is their capacitance capability. Using 32 microfarad, 135 amp max ripple current, 800 volt film capacitors (1000 volt maximum), the following results are obtained. For the minimum capacitance rating, 75 capacitors are needed in parallel. The ripple current capability is 10,125 amps which is greater than what is required. This gives a total of 75 film capacitors. These film capacitors cost approximately $60.00 each, so the total cost is $4500, which is no cost savings over the electrolytic capacitors.

FIG. 2 shows another prior art DC bus capacitor configuration that uses both electrolytic and film capacitors. Two pairs of two electrolytic capacitors 20 are connected in parallel across the DC bus. In addition, two film capacitors 21 are connected in parallel across the DC bus. With the film capacitors placed in parallel with the electrolytic capacitors, the electrolytic capacitors will carry most of the ripple current. The ripple current will flow through the electrolytic because the capacitance values in the circuit determine how much each will carry. The film capacitors will carry less than 1% of the ripple current. With the added film capacitors the ripple current capability is not increased very much. Unfortunately, even though the film capacitors are rated for a high ripple current, this does not cause them to carry this current in a circuit such as in FIG. 2. Clearly, this solution will not work.

The present invention satisfies a long felt and heretofore unsatisfied need in the field of bus capacitors for a low cost and compact solution to handling ripple currents. The bus capacitor arrangement is readily usable with existing power converters without expensive retrofitting.

SUMMARY

An object of the invention is to provide a bus capacitor configuration that has a high ripple current capability and a high capacitance value. Another object of the invention is to provide a bus capacitor scheme that is compact and low cost. Another object of the invention is to provide a bus capacitor arrangement that uses film capacitors to handle high ripple currents and electrolytic capacitors to provide a high level of capacitance to the bus.

A dc bus capacitor arrangement for power converters has at least one film capacitor connected across a dc bus. The film capacitor carries substantially all of the ripple current. A resistor is connected in series to at least one electrolytic capacitor. The series combination of the resistor and the electrolytic capacitor are connected across the dc bus. A diode has an anode connected to a positive side of the dc bus. The diode has a cathode connected between the resistor and the electrolytic capacitor such that the ripple current on the electrolytic capacitor is substantially reduced.

BRIEF DESCRIPTION OF THE DRAWINGS

These and other features, aspects and advantages of the present invention will become better understood with regard to the following description, appended claims and accompanying drawings where:

DETAILED DESCRIPTION OF THE PREFERRED EMBODIMENTS

Figure 1:
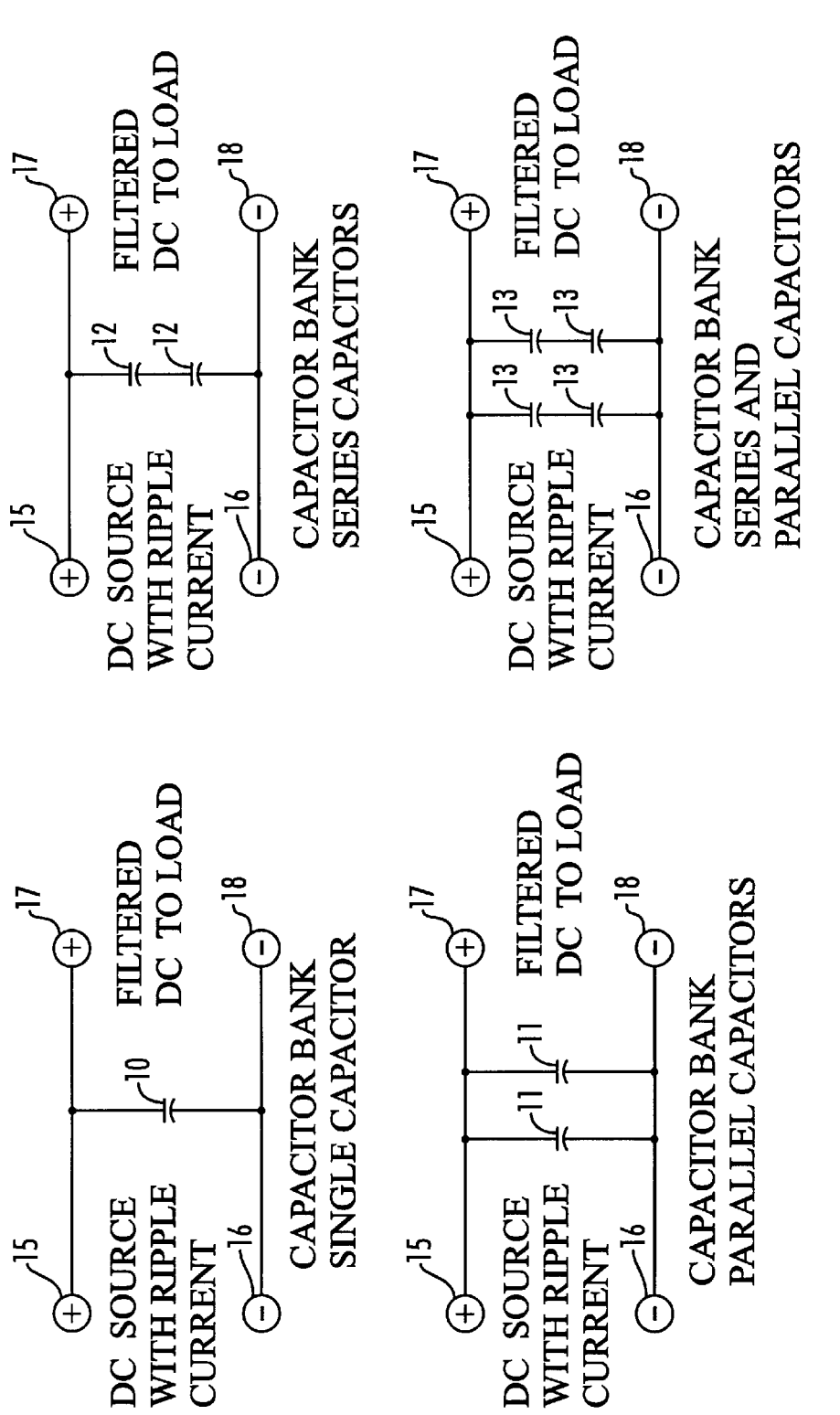
FIG. 1 shows a prior art bus capacitor configuration.
Figure 2:
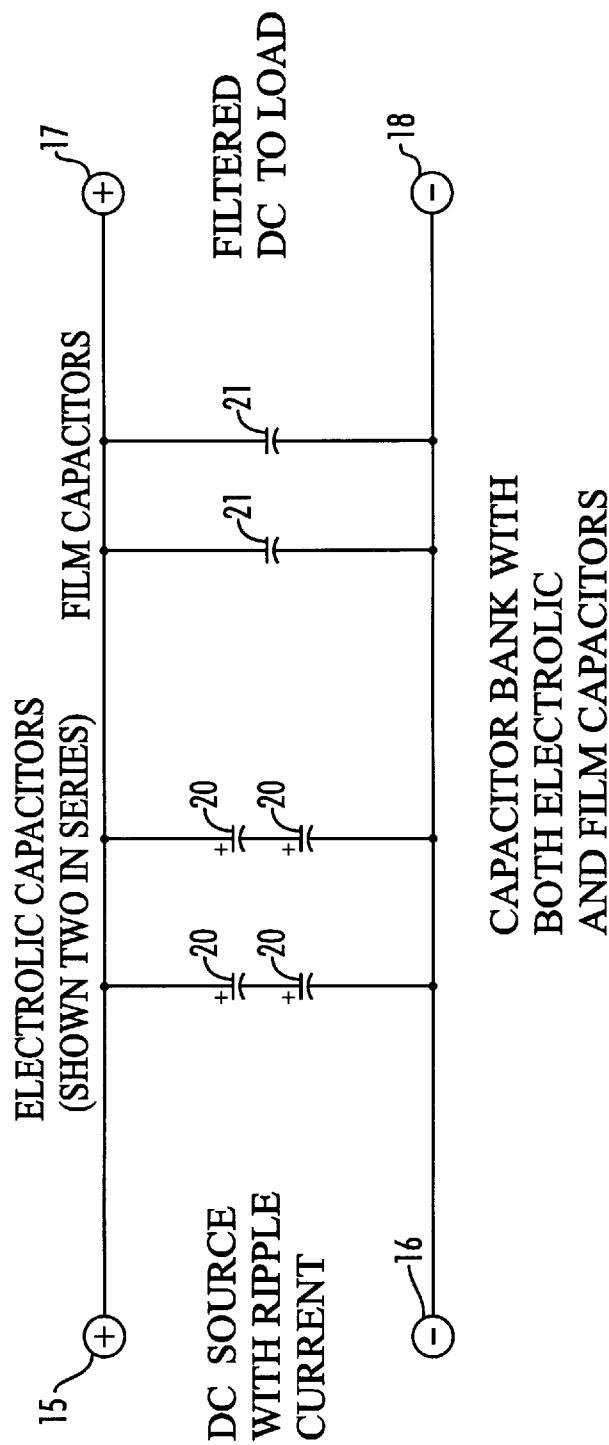
FIG. 2 shows another prior art bus capacitor configuration.
Figure 3:
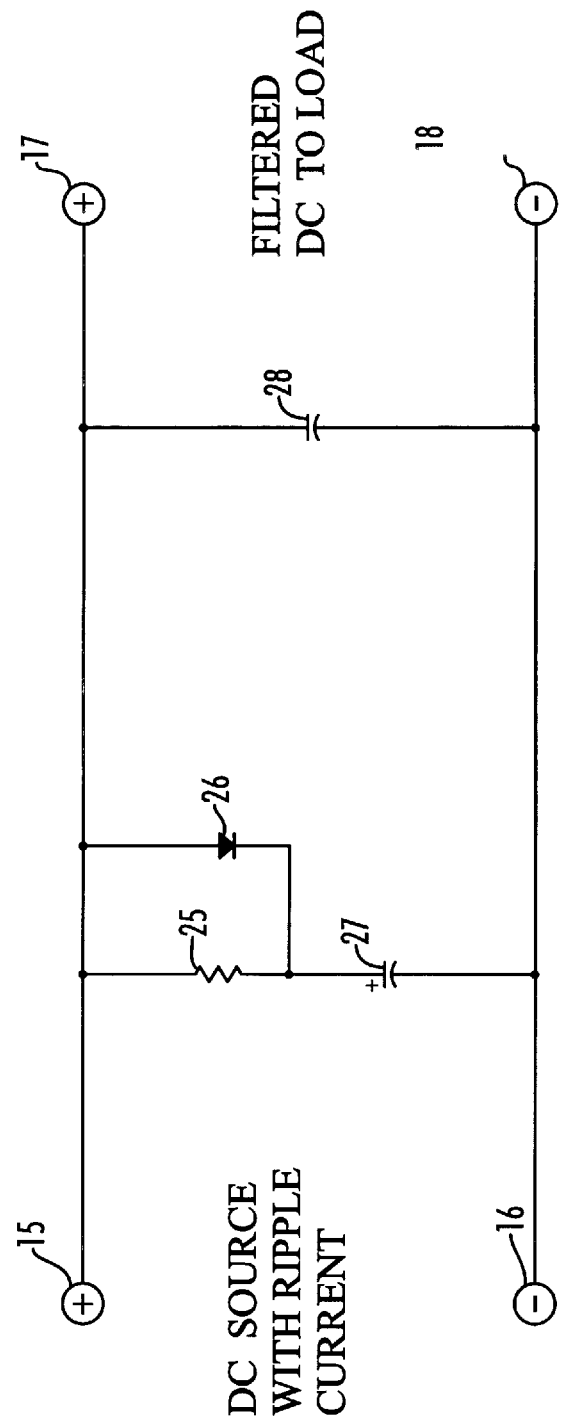
FIG. 3 shows the bus capacitor configuration of the present invention.

Referring to FIG. 3, the preferred embodiment of the bus capacitor arrangement is shown. A resistor 25 has one end connected to the positive side of a dc bus and the other end connected to an electrolytic capacitor 27. The other end of the electrolytic capacitor 27 is connected to the negative side of the dc bus. A film capacitor 28 is connected between the positive and negative dc bus. A diode 26 has an anode that is connected to the positive side of the dc bus. The diode 26 has a cathode connected to the junction of resistor 25 and the electrolytic capacitor 27. During operation, a dc voltage and current is applied between terminals 15 and 16. The filtered voltage is supplied to the load by terminals 17 and 18. This dc voltage contains ripple current. The resistor 25 isolates the electrolytic capacitor 27 from the ripple current and provides a path for discharge to the dc bus. If properly sized, this new circuit can control the ripple current in the electrolytic capacitor 27 and reduce the impedance of the dc bus. The circuit may also serve as a soft start resistor, if the diode 26 is controlled like a silicon controlled rectifier 29 as in FIG. 5 or has a relay 31 as in FIG. 7 in series with a resistor. The silicon controlled rectifier 29 would have a gate connected to a control mechanism to turn off the silicon controlled rectifier 29 during charging of the electrolytic capacitors 27 and the film capacitors 28. During discharging of the electrolytic capacitors 27 and the film capacitors 28, the control means operates to turn on the silicon controlled rectifier 29. The purpose of diode 26 is to provide a path for high current when the load is changed and energy is required to be absorbed by the large capacitance of the electrolytic capacitors 27.

The number of capacitors required and total cost for the circuit in FIG. 3 using both electrolytic capacitors 27 and film capacitors 28 can be varied using the new design. As described in the Background of the Invention, the required minimum capacitance to absorb this energy and keep the maximum voltage change less than 200 volts is 2400 microfarads. The capacitor bank must be capable of handling 230 amps of AC ripple current.

It can be assumed this design uses 32 microfarad, 135 amp max ripple current, 800 volt film capacitors 28 and 10,000 microfarad, 40 amp max ripple current, 450 volt (525 volt maximum) electrolytic capacitors 27. To obtain the needed ratings, a combination of two parallel film capacitors 28 and two series electrolytic capacitors 27 can be used. This gives a capacitance of over 5000 microfarads to absorb surges and a ripple current capability of over 270 amps, both of which exceed the requirements. The cost of the new circuit is:

| | |
|---|---|
| 2 electrolytic × $70/each | $140 |
| 2 film capacitors × $60/each | $120 |
| 1 resistor × $10/each | $10 |
| 1 diode × $50/each | $50 |
| Total | $320 |

This circuit arrangement takes advantage of the best characteristics of each capacitor type. The film capacitors 28 handle the majority of the ripple current and the electrolytic capacitors 27 give the needed capacitance. This results in cost savings as well as savings in weight, space and reliability due to fewer components.

Figure 4:
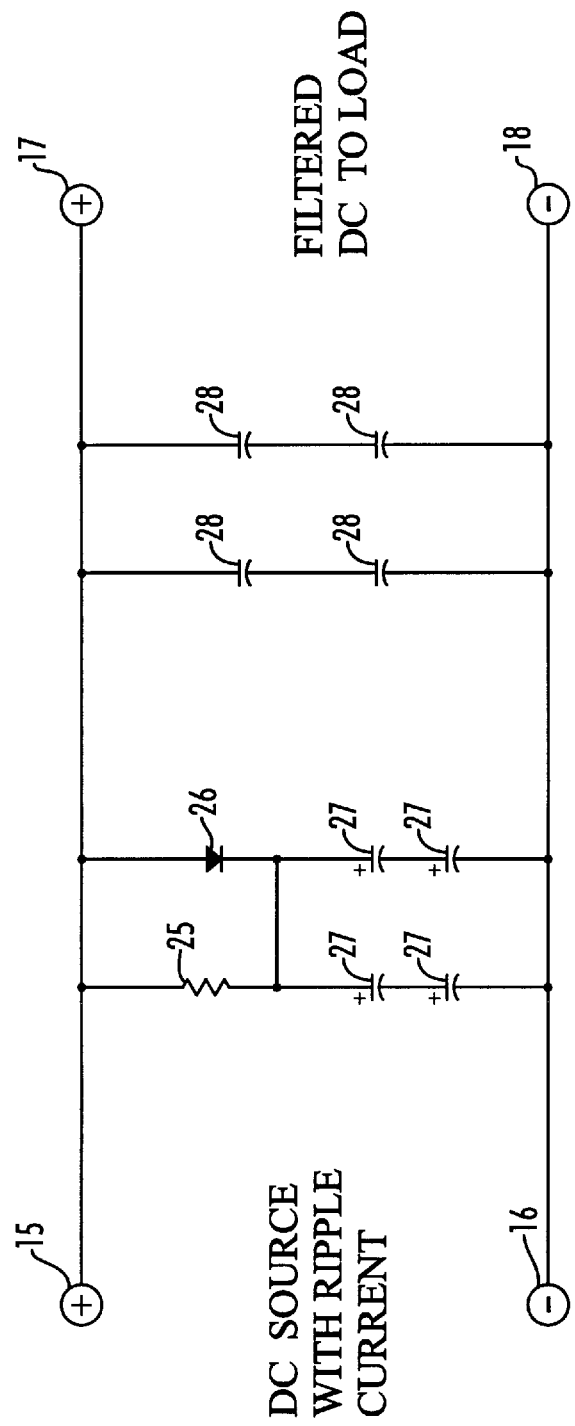
FIG. 4 shows another embodiment of the bus capacitor configuration.

FIG. 4 shows another embodiment of the invention. FIG. 4 is identical to FIG. 3 except that additional film capacitors 28 and electrolytic capacitors 27 have been added both in series and parallel to the version in FIG. 3. FIG. 4 shows how additional capacitance capability or ripple current capability can be added.

Figure 5:
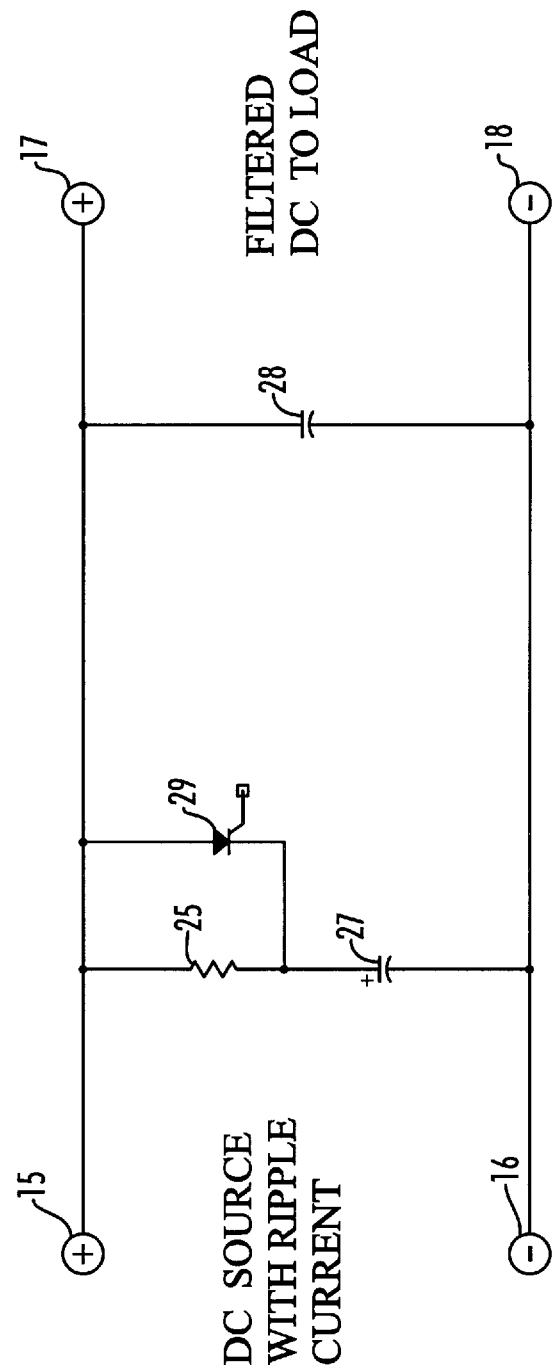
FIG. 5 shows another embodiment of the bus capacitor configuration.

FIG. 5 shows another embodiment of the invention. FIG. 5 is identical to FIG. 3 except that diode 26 has been replaced by a silicon controlled rectifier 29. The silicon controlled rectifier 29 would have a gate connected to a control mechanism to turn off the silicon controlled rectifier 29 during charging of the electrolytic capacitors 27 and the film capacitors 28. Resistor 25 limits the peak current during initial application of power. After charging of the electrolytic capacitors 27 and the film capacitors 28, the control means operates to turn on the silicon controlled rectifier 29.

Figure 6:
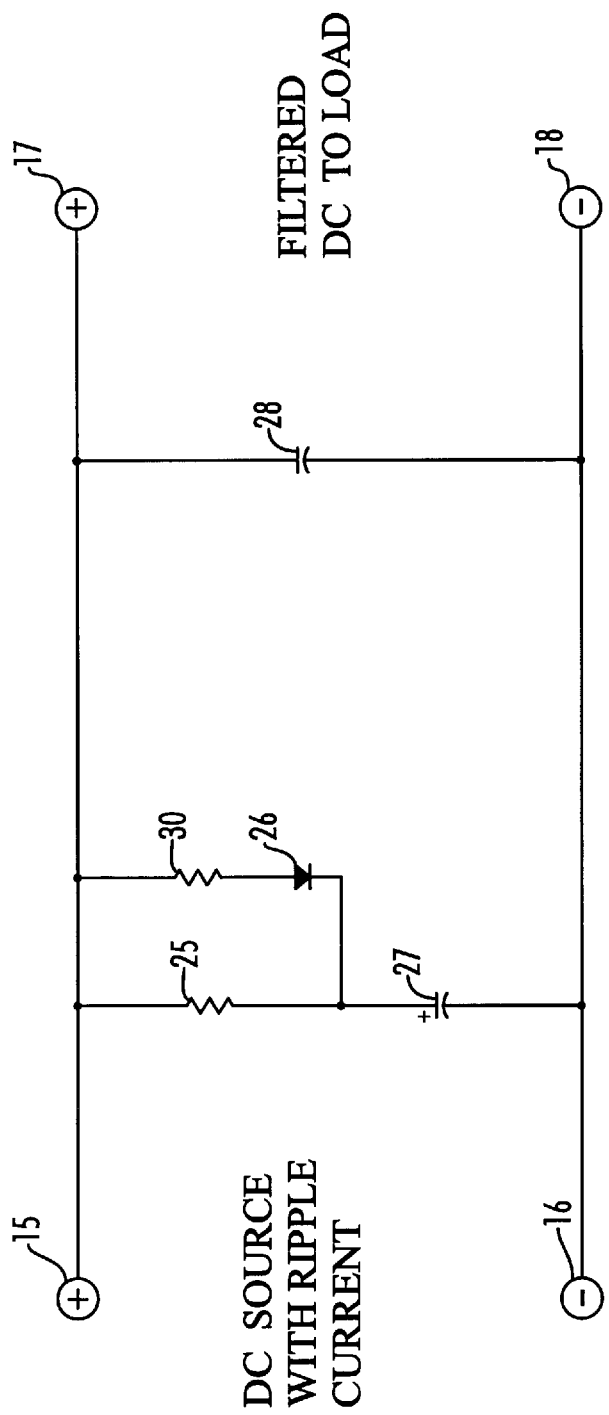
FIG. 6 shows another embodiment of the bus capacitor configuration.

FIG. 6 shows another embodiment of the invention. FIG. 6 is identical to FIG. 3 except that a resistor 30 has been added in series with diode 26. Resistor 30 limits the charging current of the electrolytic capacitors 27 without requiring any control means.

Figure 7:
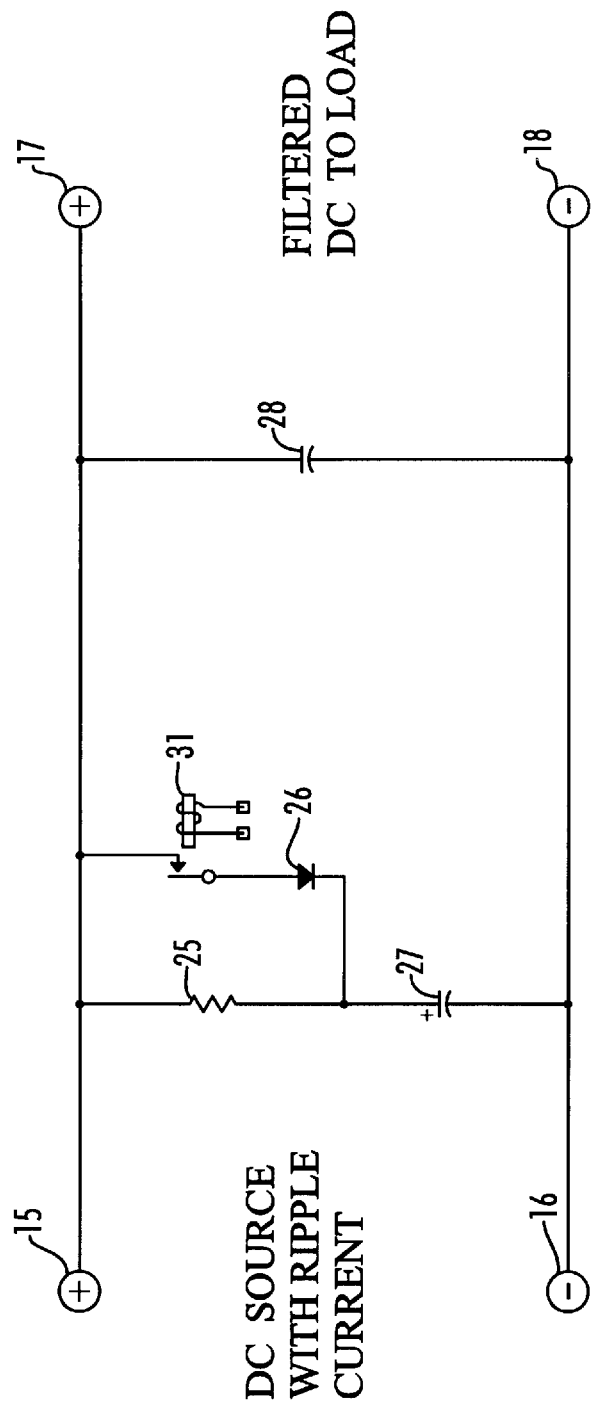
FIG. 7 shows another embodiment of the bus capacitor configuration.

FIG. 7 shows another embodiment of the invention. FIG. 7 is identical to FIG. 3 except that a relay 31 has been added in series with diode 26. The relay 31 would have a control mechanism to keep the relay 31 off during charging of the electrolytic capacitors 27 and the film capacitors 28. Resistor 25 limits the peak current during initial application of power. After charging of the electrolytic capacitors 27 and the film capacitors 28, the control means operates to turn on relay 31.

Several advantages arise from the use of the present invention. First, less components are needed thereby increasing reliability. Second, space is saved resulting in a more compact package. Third, fewer components required result in a lower cost solution for dc bus capacitors.

The present invention has been described in connection with a preferred embodiment. It will be understood that many modifications and variations will be readily apparent to those of ordinary skill in the art without departing from the spirit or scope of the invention and that the invention is not to be taken as limited to all of the details herein. Therefore, it is manifestly intended that this invention be limited only by the claims and the equivalents thereof.

What is claimed is:

1. A dc bus capacitor arrangement for power converters comprising:

at least one film capacitor connected across a dc bus, the film capacitor carrying substantially all of a ripple current;

a resistor series connected to at least one electrolytic capacitor, the series combination of the resistor and the electrolytic capacitor connected across the dc bus;

a diode having an anode connected to a positive side of the dc bus, the diode having a cathode connected between the resistor and the electrolytic capacitor such that the ripple current on the electrolytic capacitor is substantially reduced.

2. The dc bus capacitor arrangement according to claim 1 further comprising:

a relay connected in series with the diode;

a control means connected to the relay and operable to turn off the relay during charging of the electrolytic and the film capacitors, the control means further operable to turn on the relay after charging of the electrolytic and the film capacitors such that the peak charging current in the electrolytic capacitor is substantially reduced.

3. The dc bus capacitor arrangement according to claim 1 further comprising:

a resistor connected in series with the diode.

4. A dc bus capacitor arrangement for power converters comprising:

at least one film capacitor connected across a dc bus, the film capacitor carrying substantially all of a ripple current;

a resistor series connected to at least one electrolytic capacitor, the series combination of the resistor and the electrolytic capacitor connected across the dc bus;

a silicon controlled rectifier having an anode connected to a positive side of the dc bus, the silicon controlled rectifier having a cathode connected to between the resistor and the electrolytic capacitor, the silicon controlled rectifier having a gate;

a control means connected to the gate and operable to turn off the silicon controlled rectifier during charging of the electrolytic and the film capacitors, the control means further operable to turn on the silicon controlled rectifier after charging of the electrolytic and the film capacitors such that the peak charging current in the electrolytic capacitor is substantially reduced.

* * * * *